Feb. 26, 1963   G. L. BYWATERS   3,078,659
LIQUID ROCKET ENGINE SYSTEM
Filed June 30, 1959   2 Sheets-Sheet 1

INVENTOR
GORDON L. BYWATERS
BY *Russell M. Lipes, Jr.*
ATTORNEY

INVENTOR
GORDON L. BYWATERS
ATTORNEY 3,078,659
LIQUID ROCKET ENGINE SYSTEM
Gordon L. Bywaters, Glastonbury, Conn., assignor to United Aircraft Corporation, East Hartford, Conn., a corporation of Delaware
Filed June 30, 1959, Ser. No. 824,134
6 Claims. (Cl. 60—35.6)

This invention relates to liquid rocket engines, more particularly to the propellant flow and control system for one of the stages of a rocket vehicle.

The starting cycle for a known dual propellant rocket engine in which the propellants are fed to a regeneratively-cooled thrust chamber by hydrogen expanded turbine-driven centrifugal pumps depends upon a trapped volume of gas between the fuel shutoff valve and a check valve. This trapped volume has many possible leakage points, and any pressure sufficient to hold the check valve closed will leak down and cause the check valve to open in a relatively short time. Once the check valve opens, cold liquid is allowed to enter the heat exchanger and, considering the long coast periods of the rocket vehicle, probably fill the entire fuel system to the shutoff valve. At the next start the oxidizer-fuel ratio in the combustion chamber will not support combustion even if the igniter could be started under these conditions.

Further, during the coast period the fuel tank liquid has many paths to leak into the propellant pump gear box. The amount of solar radiation is so small that the liquid fuel leakage into the gear box will not be gasified. During a long coast period the gear box will fill with liquid fuel at saturation temperature with attendant disadvantages. The initial load torque is greatly increased due to churning; the possibility of mixing of oxidizer and fuel at the oxygen seal exists which may cause a fire at the next start; the gear box is filled with liquid fuel at about 40° R with only a short heat path to the oxidizer which has a freezing point of 97° R; and the amount of leakage overboard cannot be tolerated from a total impulse basis.

An object of this invention, therefore, is to provide an improved rocket engine propellant flow and control system.

Another object of the invention is to provide an improved rocket engine which is capable of multiple starts.

Another object of the invention is to provide an improved valve arrangement for a rocket engine propellant flow and control system which prevents cooldown of the heat exchanger during long coast periods and leakage of fuel into the propellant pump gear box.

Still another object of the invention is to provide a combination of propellant pump inlet shutoff valves and a fuel pump cooldown valve for a rocket engine which utilizes liquid oxygen and liquid hydrogen as propellants, and in which the propellants are fed to a regeneratively-cooled thrust chamber by a hydrogen-expanded turbine driving centrifugal pumps.

Other objects and advantages will be apparent from the following specifications and claims, and from the accompanying drawings which illustrate an embodiment of the invention.

Figure 1:
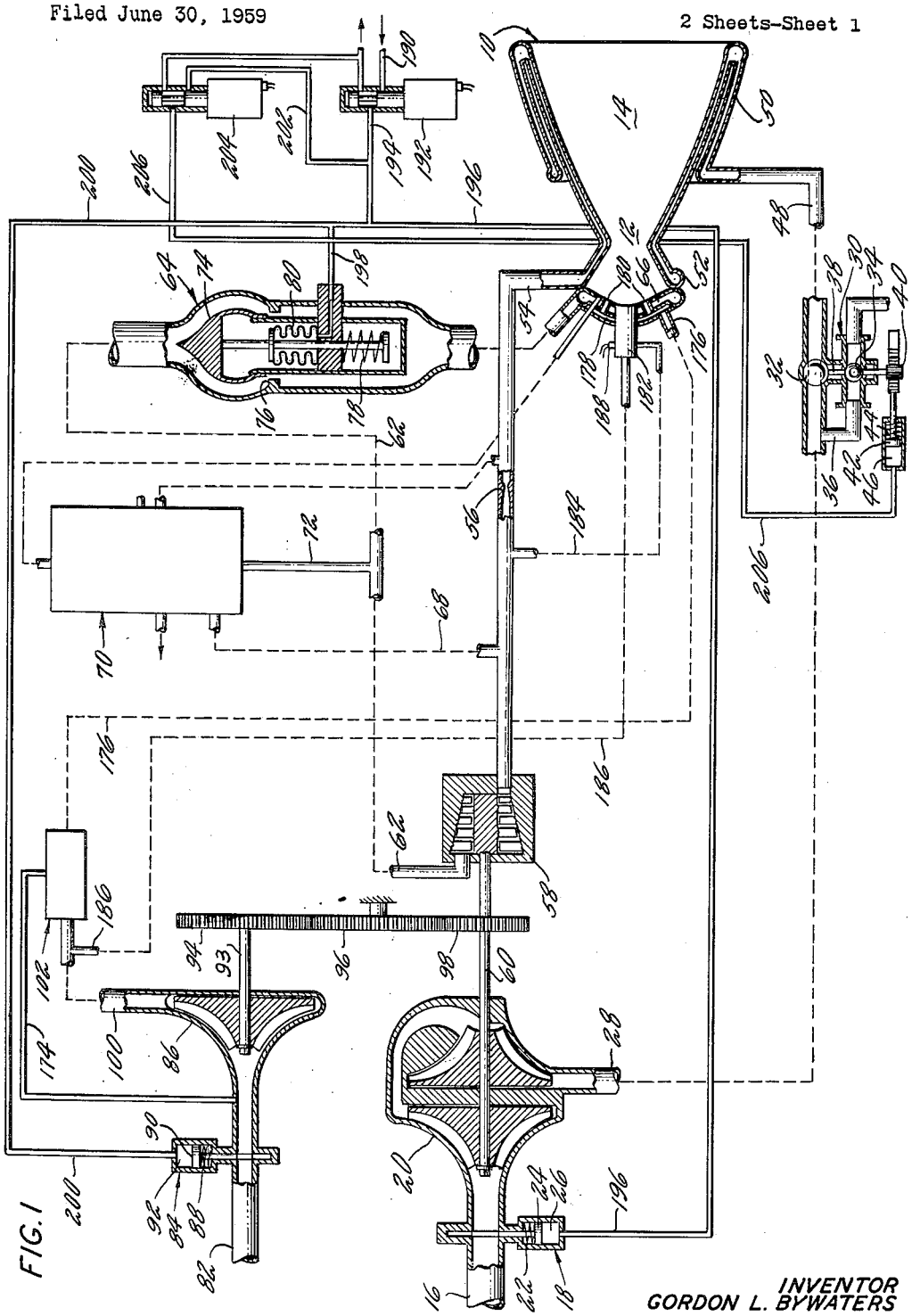
FIG. 1 is a schematic diagram of a rocket engine propellant flow and control system having the invention incorporated therein.

Referring to FIG. 1 of the drawing in detail, 10 indicates a rocket thrust chamber comprising combustion chamber 12 and thrust nozzle 14. Two propellants, one a fuel such as hydrogen and the other an oxidizer such as oxygen, are separately fed to the combustion chamber. The propellants are ignited by an ignition system to be described below.

Fuel flows from a tank, not shown, through a conduit 16 and fuel pump inlet shutoff valve 18 to two-stage centrifugal pump 20. The inlet shutoff valve is spring loaded closed by the action of spring 22 on piston 24 and is opened by the admission of pressure to chamber 26.

Fuel flows from the pump through conduit 28 to fuel pump cooldown valve 30. The cooldown valve includes ball valve 32 in conduit 28 and ball valve 34 in branch conduit 36 which leads overboard. The two ball valves are mounted on spindle 38 which is connected by rack and pinion 40 to piston 42. Prior to start the piston is loaded by spring 44 so that ball valve 32 in conduit 28 is closed and ball valve 34 in branch conduit 36 is open. When pressure is admitted to chamber 46, the piston is moved with the result that spindle 38 is rotated to open ball valve 32 and close ball valve 34.

Fuel flows from the fuel pump cooldown valve through conduit 48 to tubular thrust chamber jacket 50, flowing first through the jacket to the downstream end of the thrust chamber and then through the jacket to collector 52 surrounding combustion chamber 12. Fuel flows from the collector through conduit 54 and venturi 56 to two-stage, axial flow turbine 58 connected by shaft 60 to fuel pump 20. After being expanded across the turbine the fuel flows through conduit 62 and fuel shutoff valve 64 to manifold 66 at the upstream end of combustion chamber 12. The fuel is injected into the combustion chamber through a plurality of openings in the manifold.

Branch conduit 68 extends from conduit 54 between venturi 56 and turbine 58 and through it a quantity of fuel determined by thrust control 70 is bypassed around the turbine and introduced through connection 72 to conduit 62 downstream of the turbine.

Fuel shutoff valve 64 includes bulbular end 74 which is positioned against seat 76 by the action of spring 78 when the valve is closed, and which is moved away from the seat to an open position when pressure is admitted to bellows 80.

Oxidizer flows from a tank, not shown, through conduit 82 and oxidizer pump inlet shutoff valve 84 to centrifugal pump 86. The inlet shutoff valve is spring loaded closed by the action of spring 88 on piston 90 and is opened by the admission of pressure to chamber 92.

Oxidizer pump 86 is mounted on gear shaft 93 which carries gear 94 meshes with idler gear 96, which in turn meshes with gear 98 on turbine shaft 60. Thus, the oxidizer pump is driven by the same turbine driving fuel pump 20.

Figure 2:
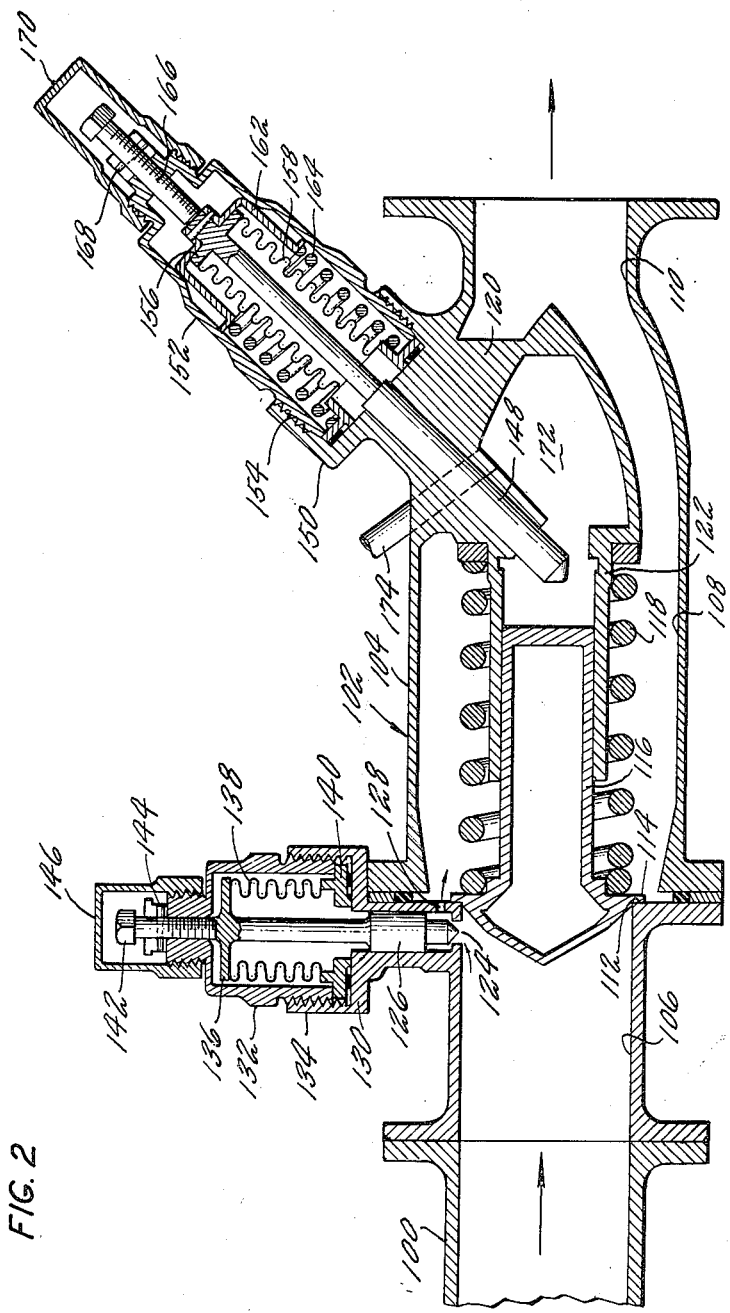
FIG. 2 is an enlarged section view of the oxidizer flow control.

Fuel flows from oxidizer pump 86 through conduit 100 to oxidizer flow control 102 comprising a starting flow adjustment and a mixture ratio adjustment. As shown in FIG. 2, the oxidizer flow control includes casing 104 defining therein upstream bore 106, enlarged bore 108, and transition portion 110 in which the enlarged bore is gradually reduced in diameter to the diameter of the upstream bore. Seat 112 is located on the shoulder between the upstream bore and the enlarged bore and is intended to be engaged by rim 114 on valve 116 when the valve is closed. Spring 118 is mountd between the valve rim and streamlined support strut 120 and loads the valve against the seat. The valve is piloted by the inner walls of guide 122 extending in an upstream direction from the support strut.

Port 124 is provided in upstream bore 106 immediately upstream of seat 112, the area of the port being controlled by starting flow needle valve 126. This port operates in conjunction with port 128 to permit a minimum quantity of oxidizer to bypass valve 116 for starting purposes.

The lower end of needle valve 126 is piloted by housing 130, cover 132 surrounding the upper end of the needle valve and being connected to the housing by threads 134. Flange 136 on the upper end of the needle valve is connected by bellows 138 to ring 140 secured in position within the housing by the lower end of cover 132. Adjusting screw 142 extends through the top of the cover for positioning the needle valve with respect to port 124, the spring action of the bellows providing an upward force on the needle valve and holding it against the lower end of the adjusting screw. Pin 144 locks the adjusting screw in position, extending through a plurality of castellations about the upper end of cover 132. Cap 146 surrounds and protects the adjusting screw.

The maximum open position of valve 116 is limited by adjustable stop 148 positioned to contact the end of the valve. The stop is piloted by housing 150, cover 152 surrounding the upper end of the stop and being connected to the housing by threads 154. Flange 156 on the upper end of the stop is connected by bellows 158 to ring 160 secured in position within the housing by the lower end of cover 152. Spring retainer 162 is integrally connected to adjustable stop 148 and surrounds flange 156 and the upper end of the stop. Spring 164 is mounted between the end of the retainer and ring 160 to provide a retracting force on the stop. Adjusting screw 166 extends through the top of cover 152 for positioning the stop with respect to the end of valve 116. Pin 168 locks the adjusting screw in position and cap 170 surrounds and protects the adjusting screw.

Oxidizer flow control 102 regulates the mixture ratio of the rocket engine from start up through and including design running conditions. The starting flow adjustment allows a minimum flow of oxidizer through the opening defined by needle valve 126 in port 124 and through port 128 to bypass closed valve 116 before the propellant pumps are started. Chamber 172 to the right of valve 116 is connected by line 174 to oxidizer conduit 82 at the inlet to oxidizer pump 86. By virtue of this connection, oxidizer flow is scheduled as a function of pump pressure head rise, or pump speed, as the propellant pumps come up to design speed. The initial opening point of the valve is controlled by the force of spring 118 and the full open position of the valve is determined by adjustable stop 148. The full open position is adjusted to trim out the flow tolerances of the system. Both the starting flow adjustment and the mixture ratio adjustment have bellows seals to permit the settings to be changed during running with zero leakage. Oxidizer flow control 102 is aerodynamically designed to insure that most of the pressure drop will be taken across rim 114 of valve 116, and support strut 120 is of airfoil cross section.

From oxidizer flow control 102, oxidizer flows through conduit 176 to manifold 178 adjacent fuel manifold 66 in combustion chamber 12. Oxidizer is injected into the combustion chamber through a plurality of jets 180, each of which is surrounded by the openings through which the fuel is injected into the combustion chamber.

Igniter chamber 182 is located centrally of propellant manifolds 66 and 178 at the upstream end of the combustion chamber. Fuel is fed to the igniter chamber through branch conduit 184 which branches off fuel conduit 54 between venturi 56 and branch conduit 68. Oxidizer is fed to the igniter chamber through branch conduit 186 which branches off oxidizer conduit 100 upstream of oxidizer flow control 102. Igniter plug 188 is provided at the side of the igniter chamber to assure the start of combustion therein.

Thrust control 70 is similar to the thrust control disclosed and claimed in copending application Serial No. 822,688 of Trent H. Holmes, filed June 24, 1959, for Liquid Rocket Thrust Control. The control includes servomechanism responsive to the pressure in combustion chamber 12 and generating a servo pressure as a function thereof to regulate the quantity of fuel bypassed around turbine 58 through branch conduit 68 and connection 72.

Helium is supplied from a tank, not shown, to supply line 190. Prestart solenoid 192 controls the connection of the supply line to line 194 from which helium is ducted through branch line 196 to chamber 26 in fuel pump inlet shutoff valve 18, through branch line 198 to the interior of bellows 80 within fuel shutoff valve 64, and through branch line 200 to oxygen pump inlet shutoff valve 84. In addition, helium will flow from line 194 through branch line 202 to start solenoid 204 which controls the admission of helium through branch line 206 to chamber 46 within fuel pump cooldown valve 30.

Operation

Prior to the start of the rocket engine, fuel conduit 16 and oxidizer conduit 82 each will be filled with a propellant as far as shutoff valves 18 and 84, respectively, which are closed. At this time overboard ball valve 34 in fuel pump cooldown valve 30 will be open and ball valve 32 will be closed. Also, fuel shutoff valve 64 will be closed, valve 116 in oxidizer flow control 102 is closed, the bypass valve in thrust control 70 is closed and igniter plug 188 will be off. With propellant shutoff valves 18 and 84 closed there should be no possibility of propellant leakage into the gear boxes for pumps 20 and 86, and when ball valve 34 is open and ball valve 32 closed there should be no possibility of fuel flowing to thrust chamber jacket 50 thus preventing cooldown of the jacket.

When the prestart signal is given, prestart solenoid 192 is actuated to admit helium from supply line 190 to line 194. The helium will flow to bellows 80 in fuel shutoff valve 64 to open the valve, and to chamber 26 in fuel pump inlet shut off valve 18 and chamber 92 in oxidizer pump inlet shutoff valve 84 to open each of these valves. The propellants then will start to flow under tank pressure through their respective systems. Fuel flows through pump 20 and conduit 28 to fuel pump cooldown valve 30 where it will be dumped overboard through branch conduit 36 by virtue of open ball valve 34. Oxidizer flows through pump 86 and conduit 100 to oxidizer flow control 102. A predetermined small quantity will flow through starting flow valve ports 124 and 128, conduit 176 and manifold 178, to combustion chamber 12. In addition, a small quantity of oxidizer flows through branch conduit 186 to igniter chamber 182. Thus, during prestart the engine is prepared for running by allowing the propellants to flow through the system to cool the propellant pumps.

A start signal is given at a predetermined interval of time after the prestart signal is given. The start signal actuates start solenoid 204 to admit helium from branch line 202 through branch line 206 to chamber 46 in fuel pump cooldown valve 30. The helium pressure in chamber 46 will move piston 42 to rotate spindle 38 and open ball valve 32 and close ball valve 34. Fuel then will flow through conduit 48, jacket 50, conduit 54, turbine 58, conduit 62, previously opened fuel shutoff valve 64 and manifold 66 to combustion chamber 12. In addition, a small quantity of fuel will flow through branch conduit 184 to igniter chamber 182, igniter plug 188 having been energized simultaneously with the start signal.

The mixture of oxidizer and fuel in the igniter chamber will be ignited by igniter plug 188 and the gaseous products will ignite the oxidizer and fuel mixture flowing to combustion chamber 12. The temperature in thrust chamber 10 immediately begins to rise to heat the fuel in jacket 50. The energized fuel will be expanded across turbine 58 to start to drive the turbine and the propellant pumps, and bootstrap operation of the engine begins. As the propellant pumps accelerate, valve 116 in oxidizer flow control 102 is opened and both propellants flow to combustion chamber 12 according to the relative capacities of the oxidizer and fuel pumps. The pressure generated in the combustion chamber by the combustion process is used to turn off the igniter plug and also to operate thrust control 70 to regulate the speed of turbine 58 and the propellant pumps. After ignition, the engine accelerates to rated thrust conditions in approximately one second. During running of the engine, all of the valves with the exception of ball valve 34 are open and the igniter plug is off.

To shut down the engine, the actuating signals to prestart solenoid 192 and start solenoid 204 are terminated with the result that the helium flow to line 194 is cut off, and the helium in line 194, branch lines 196, 198, 200, 202 and 206 is vented overboard. This will result in the closing of fuel shutoff valve 64, the actuation of the fuel pump cooldown valve 30 to open ball valve 34 and close ball valve 32, and the closing of propellant pump inlet shutoff valves 18 and 84. In addition, valve 116 in oxidizer flow control 102 and the bypass valve in thrust control 70 will close as thrust decays. Operation of the engine will terminate.

It is to be understood that the invention is not limited to the specific embodiment herein illustrated and described, but may be used in other ways without departure from its spirits as defined by the following claims.

I claim:

1. In a propellant flow and control system for a liquid rocket engine, a thrust chamber, conduit means through which fuel is supplied to said thrust chamber, conduit means through which oxidizer is supplied to said thrust chamber, means for pumping fuel and oxidizer through said conduit means, overboard vent means connected to said fuel conduit means, a heat exchanger in said fuel conduit means, means for driving said pumping means by the expansion of fuel heated in said heat exchanger, first valve means in the fuel and oxidizer conduits controlling the inlets to said pumping means, and second valve means in said fuel conduit means between said pumping means and said heat exchanger controlling fuel flow through said conduit means and through said overboard vent means, means for delivering a first signal pressure to actuate said first valve means, and means for delivering a second signal pressure to actuate said second valve means, said signal delivering means operating in timed relation to each other.

2. In a propellant flow and control system for a liquid rocket engine, a thrust chamber, conduit means through which fuel is supplied to said thrust chamber, conduit means through which oxidizer is supplied to said thrust chamber, means for pumping fuel and oxidizer through said conduit means, a heat exchanger in said fuel conduit means, overboard vent means connected to said fuel conduit means between said pumping means and said heat exchanger, means for driving said pumping means by the expansion of fuel heated in said heat exchanger, first valve means controlling the inlets to said pumping means, means normally closing said first valve means, cooldown valve means in said fuel conduit means between said heat exchanger and said overboard vent means, means in said cooldown valve means normally closing said fuel conduit means and opening said overboard vent means, means for opening said first valve means, and means for operating said cooldown valve means subsequent to the opening of said first valve means to open said fuel conduit means and close said overboard vent means.

3. In a propellant flow and control system for a liquid rocket engine, a thrust chamber, conduit means through which fuel is supplied to said thrust chamber, conduit means through which oxidizer is supplied to said thrust chamber, means for pumping fuel and oxidizer through said conduit means, heat exchanger means in said fuel conduit means, branch conduit means connected to said fuel conduit means between said pumping means and said heat exchanger, means for driving said pumping means by the expansion of fuel heated in said heat exchanger, first valve means at the inlets to said pumping means, second valve means in said branch conduit means, and third valve means in said fuel conduit means between said branch conduit means and said heat exchanger means, means for closing said first and said third valve means and for opening said second valve means when said engine is not operating, means for opening said first valve when said engine is to be started, and means for simultaneously closing said second valve means and opening said third valve means after said first valve has been opened.

4. In a propellant flow and control system for a liquid rocket engine, a thrust chamber, conduit means through which fuel is supplied to said thrust chamber, conduit means through which oxidizer is supplied to said thrust chamber, means for pumping fuel and oxidizer through said conduit means, a heat exchanger in said fuel conduit means, overboard vent means connected to said fuel conduit means between said pumping means and said heat exchanger, means for driving said pumping means by the expansion of fuel heated in said heat exchanger, first valve means controlling the inlets to said pumping means, means normally closing said first valve means, cooldown valve means in said fuel conduit means between said heat exchanger and said overboard vent means, means in said cooldown valve means normally closing said fuel conduit means and opening said overboard vent means, flow controlling means in said fuel conduit means, means normally closing said fuel flow controlling means, flow controlling means in said oxidizer conduit means, means normally closing said oxidizer flow controlling means, minimum flow means in said oxidizer flow controlling means, means for opening said first valve means and said fuel flow controlling means, and means for subsequently operating said cooldown valve means to open said fuel conduit means and close said overboard vent means.

5. In a propellant flow and control system for a liquid rocket engine, a thrust chamber, conduit means through which a propellant is supplied to said thrust chamber, means for pumping said propellant through said conduit means, overboard vent means connected to said propellant conduit means, first valve means controlling the inlet to said pumping means, two-position cooldown valve means in said propellant conduit means between said pumping means and said thrust chamber, said cooldown valve means having means for opening said propellant conduit means and closing said overboard vent means in one position and means for closing said propellant conduit means and opening said overboard vent means in the other position said cooldown valve means being normally in said other position, signal means for opening said first valve means, and signal means for positioning said cooldown means in said one position in predetermined timed relation to the opening of said first valve means.

6. In a propellant flow and control system for a liquid rocket engine, a thrust chamber, a source of propellant, conduit means through which said propellant is delivered to said thrust chamber, means for pumping said propellant through said conduit means, vent means connected to said conduit means between said pumping means and said thrust chamber, means normally opening said conduit to said vent and closing said conduit downstream of said vent, valve means controlling the inlet to said pump, means for opening said valve means, and means for closing said vent and opening said conduit downstream of said vent in predetermined timed relation to the opening of said valve.

References Cited in the file of this patent

UNITED STATES PATENTS

| | | |
|---|---|---|
| 2,395,113 | Goddard | Feb. 19, 1946 |
| 2,483,045 | Harby | Sept. 27, 1949 |
| 2,558,483 | Goddard | June 26, 1951 |
| 2,704,438 | Sheets | Mar. 22, 1955 |
| 3,000,176 | Kuhrt | Sept. 29, 1961 |